United States Patent
Norton et al.

(10) Patent No.: US 7,516,151 B2
(45) Date of Patent: Apr. 7, 2009

(54) PARALLEL TRAVERSAL OF A DYNAMIC LIST

(75) Inventors: Scott J. Norton, San Jose, CA (US); Hyun J. Kim, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 446 days.

(21) Appl. No.: 10/979,413

(22) Filed: Nov. 1, 2004

(65) Prior Publication Data
US 2006/0095910 A1 May 4, 2006

(51) Int. Cl.
*G06F 17/00* (2006.01)
(52) U.S. Cl. ........................ 707/102; 707/101; 707/202
(58) Field of Classification Search ........................ None
See application file for complete search history.

(56) References Cited

U.S. PATENT DOCUMENTS

| | | | |
|---|---|---|---|
| 5,187,790 A * | 2/1993 | East et al. ................... | 719/316 |
| 5,321,841 A * | 6/1994 | East et al. ................... | 718/107 |
| 6,516,327 B1 * | 2/2003 | Zondervan et al. .......... | 707/200 |
| 6,704,737 B1 * | 3/2004 | Nixon et al. ................. | 707/101 |
| 6,947,425 B1 * | 9/2005 | Hooper et al. ............... | 370/394 |
| 2002/0133508 A1 * | 9/2002 | LaRue et al. ................. | 707/202 |
| 2005/0149936 A1 * | 7/2005 | Pilkington ................... | 718/102 |
| 2005/0149937 A1 * | 7/2005 | Pilkington ................... | 718/102 |
| 2006/0168589 A1 * | 7/2006 | Moore ......................... | 719/315 |
| 2006/0173885 A1 * | 8/2006 | Moir et al. ................... | 707/101 |

\* cited by examiner

*Primary Examiner*—Christian P. Chace
*Assistant Examiner*—Bai D Vu

(57) ABSTRACT

A computer-implemented method for traversing a first set of objects in a first dynamic list in a computer system. The method includes partitioning copies of the first set of objects into a plurality of second dynamic lists, each of the plurality of second dynamic lists being configured to contain a subset of the copies of the first set of objects, copies of the first set of objects being disposed in the plurality of second dynamic lists. The method also includes traversing the plurality of second dynamic lists using a plurality of traversal threads, thereby causing at least some of the copies of the first set of objects to be traversed in parallel.

37 Claims, 5 Drawing Sheets

PARALLEL TRAVERSAL OF A DYNAMIC LIST

BACKGROUND OF THE INVENTION

In some operating systems, an unbounded set of instances of homogenous objects is often represented with a linked list. For example, a set of active threads may be represented by items in single dynamic linked list of threads (known as active threads list) in the scheduler subsystem of the operating system.

The single dynamic linked list of threads may be traversed from time to time (e.g., once every second) in order to re-prioritize threads with non-fixed priority. The re-prioritization may be based on a set of parameters, such as the CPU consumption of the threads, and involves adjusting the priority assigned to each thread. In the HP-UX™ operating system architecture (available from the Hewlett-Packard Company of Palo Alto, Calif.), a kernel daemon thread is employed to traverse the dynamic linked list to perform the aforementioned re-prioritization. Since the list may be unbounded in size, such traversal by a single kernel daemon thread may take some time.

With reference to FIG. 1A, a plurality of thread objects are shown along active threads list 102, including thread objects 918 and 4017. Thread object 918 is shown having a priority number 180, while thread object 4017 is shown having a priority value 112.

In FIG. 1B, the kernel daemon has traversed active threads list 102 and re-prioritize the priority values associated with the thread objects therein. For example, a thread that has not been executed recently may be given a higher priority to promote fairness, for example, while a thread that has been extensively executed may have its priority reduced, again to promote fairness, for example. Accordingly, thread object 918 is shown having a priority number 90, while thread object 4017 is shown having a priority value 100.

When a thread is created, it is scheduled into one of the per-processor run queues, and more specifically, into a priority band of a per-processor run queue based on the priority value associated with its thread object copy in one of the hash chains. In the example of FIG. 1B, thread 918 and thread 4017 happen to be assigned by the scheduler to the same processor (although such is not required) and are scheduled into priority bands 152A and 152B respectively of a run queue 130 of one of the processors. The scheduler typically decides which processor of the multi-processor system the thread is assigned for execution. Once the thread is scheduled into a priority band of one of the processor's run queue, it will be executed by that processor based on the priority band value, which is kept track of by the kernel.

Unfortunately, while the traversal of the list takes place, a critical system-wide resource is rendered unavailable for use by other entities. Specifically, a global lock is held by the kernel daemon thread for the duration of the traversal. While this system-wide resource is held, certain operations such as process/thread creation and termination are blocked to prevent the thread from being changed while re-prioritizing takes place.

For a system with few active threads, such blocking may simply cause a minor delay if operations that require the availability of the system-wide lock is undertaken while the kernel daemon thread traverses the dynamic linked list. For a system with millions of active threads, such blocking may cause an unreasonable delay and unacceptable degradation in system performance.

SUMMARY OF INVENTION

The invention relates, in an embodiment, to a computer-implemented method for traversing a first set of objects in a first dynamic list in a computer system. The method includes partitioning copies of the first set of objects into a plurality of second dynamic lists, each of the plurality of second dynamic lists being configured to contain a subset of the copies of the first set of objects, copies of the first set of objects being disposed in the plurality of second dynamic lists. The method also includes traversing the plurality of second dynamic lists using a plurality of traversal threads, thereby causing at least some of the copies of the first set of objects to be traversed in parallel.

In another embodiment, the invention relates to an article of manufacture comprising a program storage medium having computer readable code embodied therein. The computer readable code being configured to traverse a first set of objects in a first dynamic list in a computer system. The article of manufacture includes computer-implemented code for partitioning copies of the first set of objects into a plurality of second dynamic lists, each of the plurality of second dynamic lists being configured to contain a subset of the copies of the first set of objects, the copies of the first set of objects being disposed in the plurality of second dynamic lists. The article of manufacture also includes computer-implemented code for traversing the plurality of second dynamic lists using a plurality of traversal threads, thereby causing at least some of the copies of the first set of objects to be traversed in parallel.

In yet another embodiment, the invention relates to an arrangement configured for traversing a first set of objects in a first dynamic list in a computer system. The arrangement includes a plurality of first means configured to contain copies of the first set of objects, each of the plurality of first means being configured to contain a subset of the copies of the first set of objects. The arrangement also includes means for traversing at least two of the plurality of first means in parallel, thereby causing at least some of the copies of the first set of objects to be traversed in parallel.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1A:
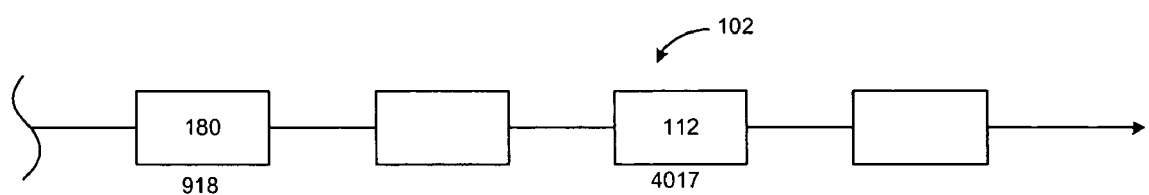
FIGS. 1A and 1B illustrate the concept of reprioritizing priority values in thread objects of an active threads list.
Figure 1B:
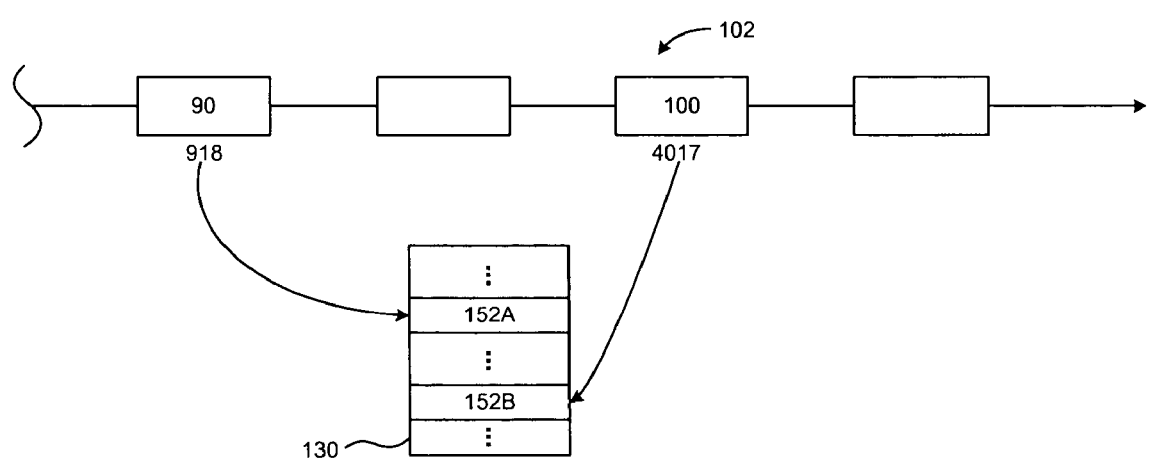

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general purpose computer and/or a dedicated computing device when appropriately programmed and may include a combination of a computer/computing device and dedicated/programmable circuits adapted for the various tasks pertaining to embodiments of the invention.

The use of hash tables to facilitate data retrieval is well-known. Hash tables are particularly well-suited to implementing fast lookups. In the present case, the inventors employ hashing to partition a large data set, such as the set of active threads.

In an embodiment, objects in the prior art global unbounded list are copied into a plurality of hash buckets. Each hash bucket has a pointer to a dynamic linked list, known as a hash chain. When a copy of an object is hashed to a particular bucket, that object copy is inserted into the hash chain that is pointed to by that bucket. The plurality of hash chains is then traversed by a plurality of threads in parallel in order to perform the aforementioned re-prioritizing. In this manner, the time-consuming serial approach of the prior art on the single unbounded thread is replaced by parallel operations on the plurality of hash chains.

Hashing may be performed using any hashing algorithm. In an embodiment, hashing is performed using a modulus operation on the ID of the thread represented by the object copy. In an embodiment, the base of the modulus operation is set to be equal to the number of hash buckets, which is also set to be equal to the number of available processors in a multi-processor system. The number of available processors may equal to the number of processors in the computer system or may be fewer since one or more of the processors in the computer system may be reserved and may thus be unavailable for the traversal task. Since there are as many hash buckets as there are available processors in the computer system, and since there is a one-to-one correspondence between a hash bucket and its hash chain, this arrangement makes it possible for the available processors to traverse the plurality of hash buckets in parallel, thereby reducing the amount of time required to traverse all object copies.

In an embodiment, hash chains are implemented by double-linked lists. The ID of a thread may be employed as a pointer to the object copy that represents that thread in one of the hash chains. Accordingly, when a thread terminates and needs to be removed from one of the hash chains, it is not necessary to perform a hash to find out which hash chain contains the object copy that corresponds to that thread. The use of the thread ID as a pointer allows direct manipulation of the double-linked list to remove the object copy that corresponds to the thread when the thread terminates. Accordingly, removal from a hash chain can be a very fast and low cost operation.

An analogy may be made to a queue of customers waiting in line to be served. Each customer holds a ticket, the value of which determines when the customer would be served. In this particular customer service scenario, the ticket value held by a customer is changed from time to time depending on certain parameters. The queue of customers may be analogized to the unbounded single list in the prior art, with each customer representing a thread object. The ticket value held by each customer may be analogized to the priority assigned to each thread object. Thus, in the prior art, a single employee (analogy: single kernel daemon) serially works his way through the entire queue of customers (analogy: single unbounded list) to adjust the value of the customers' tickets (analogy: re-prioritize the priorities of the thread objects).

In embodiments of the present invention, the thread objects are hashed into a plurality of bucket queues. Thus, the customers sent their representatives, who are divided into smaller groups. An employee can perform the ticket value adjustment task for each of the smaller groups. Accordingly, a plurality of employees (analogy: parallel threads) can be employed to adjust, in a parallel manner, the ticket values held by the customers' representatives (analogy: reprioritize the priorities held by the thread object copies) in the plurality of small customer groups (analogy: in the plurality of hash chains).

The end result is still the same, i.e., the priorities are re-prioritized. However, embodiments of the invention allow such re-prioritizing to take place in parallel by multiple threads (and multiple processors). The scheduler may then employ the priority values held by the thread copies in the hash chains to determine when a thread should be scheduled into one of the processor's run queues for execution.

Figure 2:
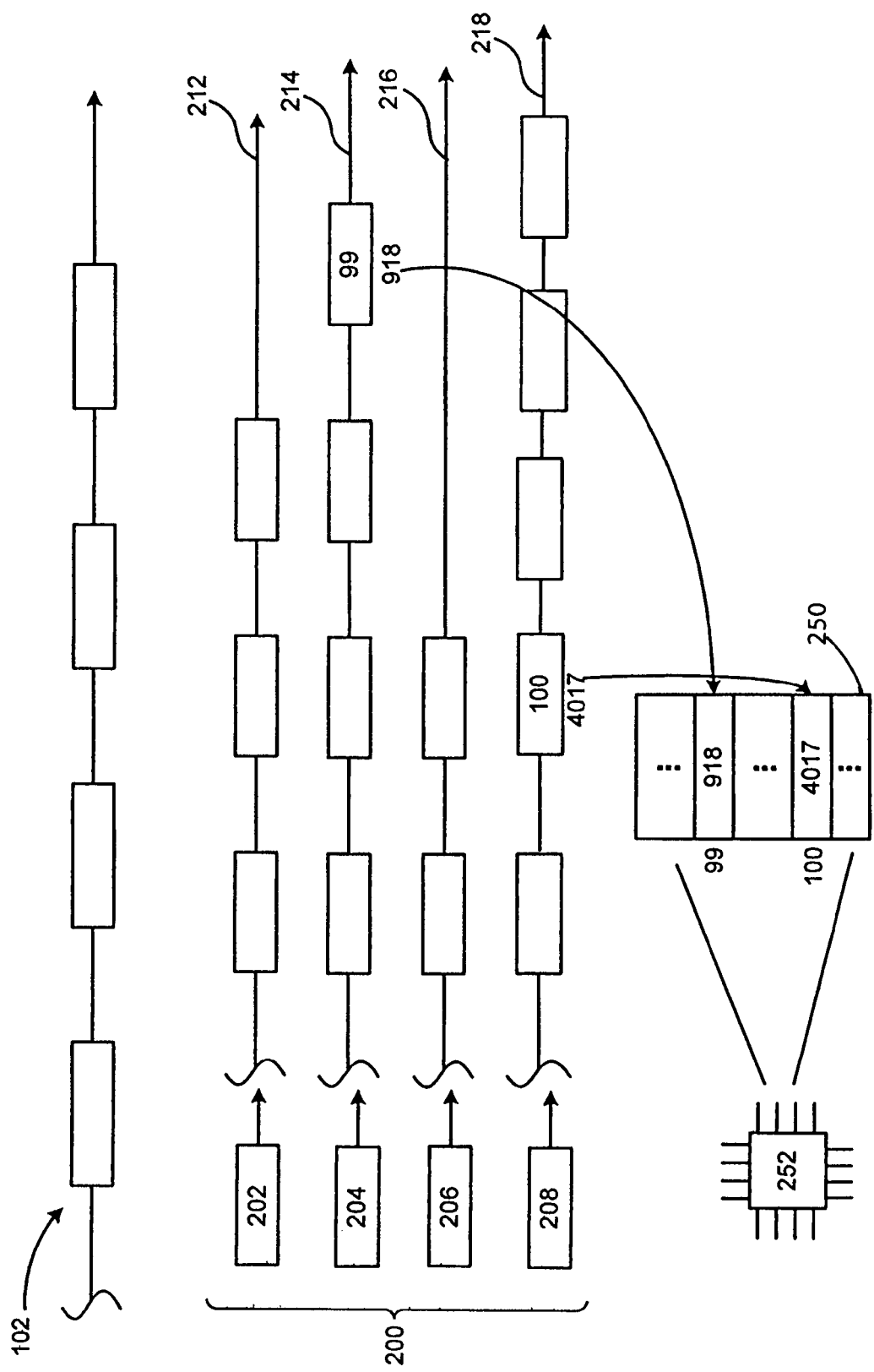
FIG. 2 shows, in accordance with an embodiment of the present invention, the partitioning of the single unbounded list into a plurality of hash buckets for parallel traversal.

FIG. 2 shows, in accordance with an embodiment of the present invention, the partitioning of the single unbounded list into a plurality of hash buckets for parallel traversal. For illustration purposes, list 102 of FIG. 1A is shown again in FIG. 2. A dynamic hash data structure 200 comprising a plurality of hash buckets, including hash buckets 202, 204, 206, and 208, is shown. The number of hash buckets may be variable, with a larger number of buckets tending to promote parallel operations if there are a sufficient number of available processors to parallelly execute traversal threads. In an embodiment, there are as many hash buckets as there are available processors to execute a traversal algorithm.

Each hash bucket has a pointer to a hash chain, which is implemented by a linked list in an embodiment. Thus hash bucket 202 has a pointer to a hash chain 212, for example. Copies of thread objects in list 102 are hashed into the hash buckets such that a thread object in list 102 would have its thread copy hashed into one of the hash buckets. To facilitate rapid removal of objects from the hash chains, the hash chains may be implemented using double-linked lists. During re-prioritizing, a plurality of traversal threads operates on the plurality of hash chains in parallel to re-calculate the priority values associated with the thread object copies in the hash chains.

The scheduler then operates off the dynamic hash data structure, and more particularly off the priority values contained in the thread object copies in order to schedule the thread objects into one of the processors' run queues. In the example of FIG. 2, object 4017 in hash chain 218 has a priority value of 100, while object 918 in hash chain 214 has a priority value of 99. To simplify the discussion, assume that both thread objects 4017 and 918 are scheduled into a run queue 250 of a processor 252. In this case, object 4017 is scheduled into priority band 100, while object 918 is scheduled into priority band 99. Once scheduled, the kernel may subsequently execute, based on their respective priority bands, threads 4017 and 918 on processor 252.

Figure 3:
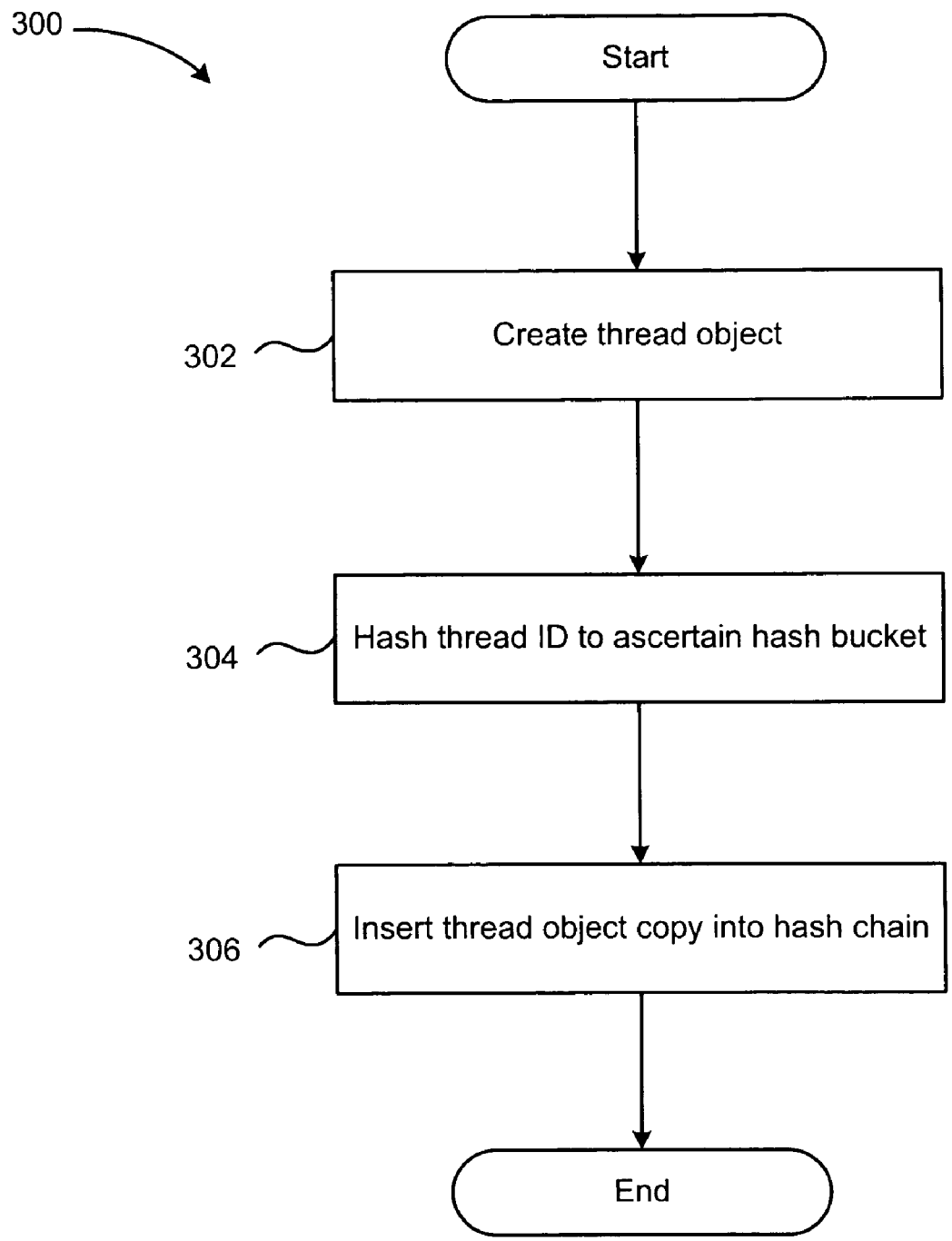
FIG. 3 shows, in accordance with an embodiment of the present invention, the steps undertaken when a thread is created and a thread copy object needs to be inserted into one of the hash chains.

FIG. 3 shows, in accordance with an embodiment of the present invention, the steps undertaken when a thread is created and a thread copy object needs to be inserted into one of the hash chains. In step 302, the thread is created. In step 304, the thread's ID is hashed in order to ascertain the hash bucket to which the thread copy object belongs. In an embodiment, a modulus operation is performed on the thread ID, with the modulus base being equal to the number of hash buckets. In an embodiment, the number of hash buckets is set to be equal to the number of available processors, as mentioned earlier. Once the specific hash bucket is identified, the thread object copy is inserted (step 306) into the hash chain associated with that specific hash bucket. The method ends at step 308.

Figure 4:
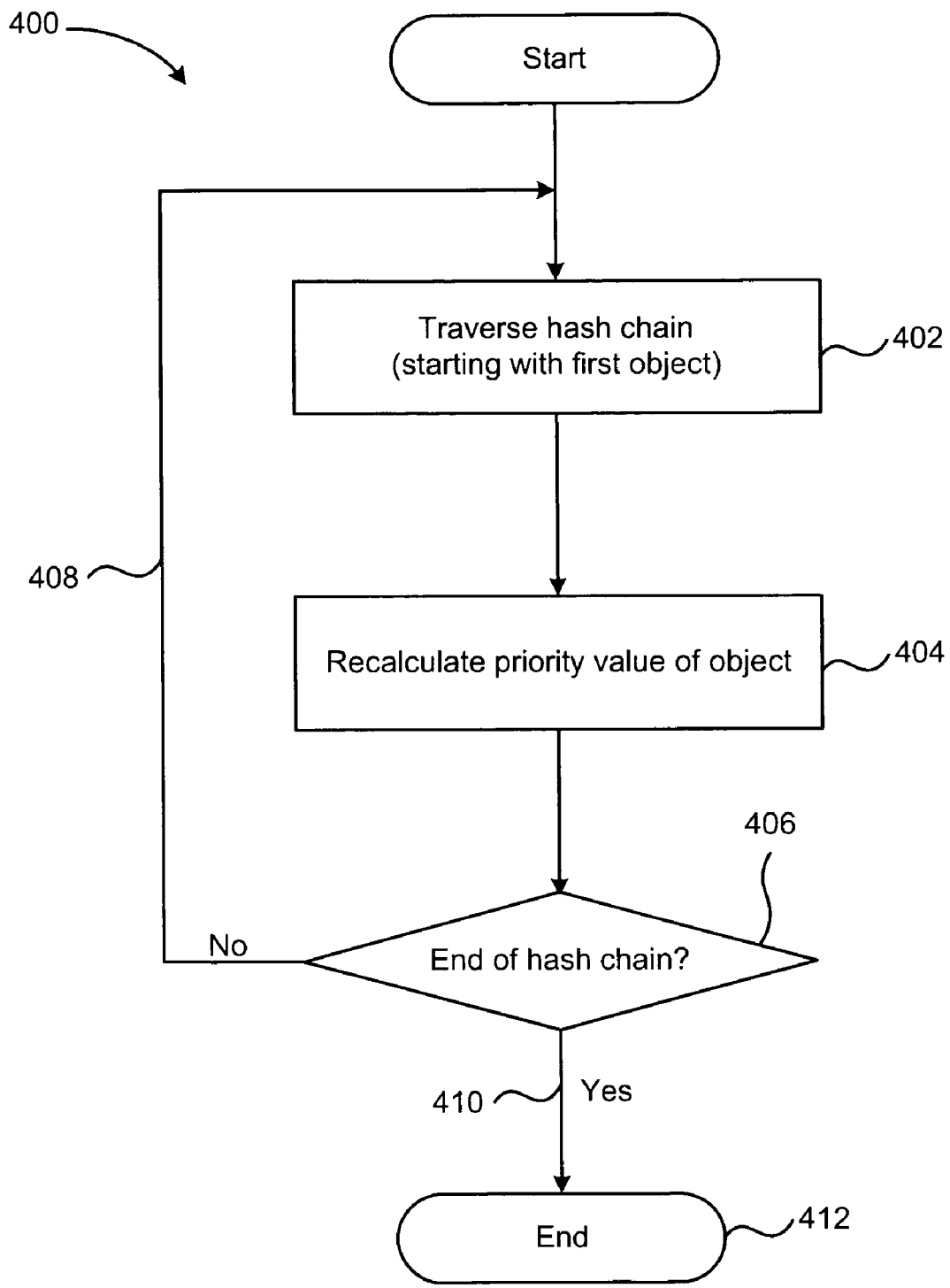
FIG. 4 shows, in accordance with an embodiment of the present invention, the steps undertaken when traversing a hash chain.

FIG. 4 shows, in accordance with an embodiment of the present invention, the steps undertaken when traversing a hash chain. As mentioned, each hash chain may be traversed by a traversal thread, with multiple traversal threads operating in parallel. In step 402, the traversal thread begins traversing a hash chain starting with the first thread copy object therein. In step 404, the priority value associated with the thread copy object is re-calculated. As discussed, the priority value may be recalculated for a thread to ensure fairness during scheduling, for example. Priority value re-calculation may be performed using any priority recalculation algorithm and may be based on any number of factors, including for example the recent CPU usage level of the thread. The priority value recalculation continues with all thread copy objects of the hash chain (step 406 and arrow 408) until the end of the thread is reached (step 406 and arrow 410). The traversal method for each hash chain ends at step 412.

Removal of a thread object from a hash chain is performed when the thread terminates. If the thread ID is employed as a pointer, removal may be accomplished using conventional linked list pointer manipulation techniques. If necessary, hashing may be performed to pin-point the identity of the hash bucket and the associated hash chain. Thereafter, the hash chain may be traversed until the thread object to be removed is found. The removal of an object from a linked list may be performed using conventional linked list pointer manipulation.

As can be appreciated from the foregoing, the invention permits the traversal of objects in an unbounded active threads list, which was traversed in a serial manner in the prior art, to be traversed by multiple traversal threads in parallel. In this manner, performance is greatly improved since the thread copy objects may be re-prioritized in parallel quickly. Since the dynamic hash data structure is updated upon thread startup and thread removal, it accurately reflects the threads tracked by the active threads list, and may be relied upon by the scheduler in scheduling threads for execution.

Figure 5:
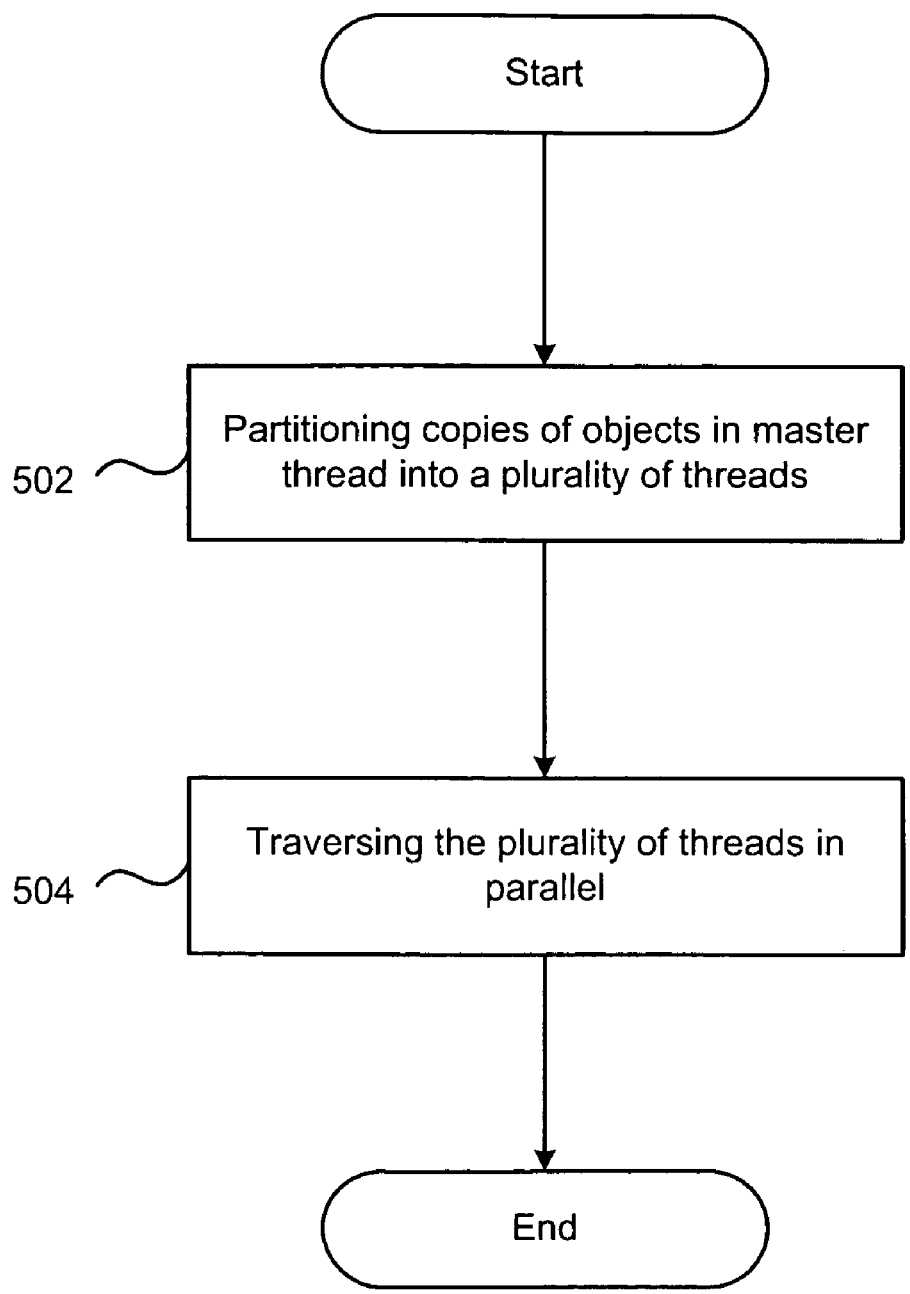
FIG. 5 shows, in accordance with an embodiment of the present invention, the general case for traversing a dynamic list.

Although the invention has been discussed in the context of a active threads list for use in conjunction with a scheduler, embodiments of the invention applies to any situation wherein a dynamic list needs to be traversed. FIG. 5 shows, in accordance with an embodiment of the present invention, the general case for traversing a dynamic list. In step 502, the objects in the master dynamic list are copied into a plurality of threads. Each of these threads contains a subset of the objects in the dynamic master list in a non-overlapping manner. That is, a copy of an object in the master dynamic list maps into only one of the plurality of threads. The mapping may be performed using a hashing algorithm as discussed, or may be performed using any form of calculation, table translation, or algorithm that achieves such mapping. Preferably, the mapping is performed in such a way that each of the plurality of threads has roughly the same number of members therein to minimize the amount of time required to traverse all the plurality of threads in parallel. In step 504, the plurality of threads are traversed in parallel using a plurality of processes.

While this invention has been described in terms of several embodiments, there are alterations, permutations, and equivalents that fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for traversing a first set of objects in a first dynamic list in a computer system, comprising:
   providing said first dynamic list that includes said first set of objects;
   copying said first set of objects by using a computer;
   partitioning copies of said first set of objects in said first dynamic list in an operating system of the computer system into a plurality of second dynamic lists in the operating system, each second dynamic list of said plurality of second dynamic lists contains a different subset of said copies of said first set of objects, copies of said first set of objects being disposed in said plurality of second dynamic lists;
   wherein said first dynamic list represents an active threads list being used in conjunction with a scheduler in said computer system, said first set of objects represent thread objects in said active threads list; and
   traversing said plurality of second dynamic lists in parallel by using a plurality of kernel traversal threads, thereby causing at least some of said copies of said first set of objects to be traversed in parallel by the kernel traversal threads;
   wherein said traversing of said plurality of second dynamic lists in parallel includes re-calculating priority values associated with said copies of said first set of objects that are disposed in said plurality of second dynamic lists; and
   wherein said traversing of said plurality of second dynamic lists includes modifying a priority value associated with each of said copies of said first set of objects.

2. The method of claim 1 wherein a number of said second dynamic lists equals a number of available processors in said computer system.

3. The method of claim 1 wherein said partitioning employs a hashing algorithm.

4. The method of claim 3 wherein said hashing algorithm employs thread IDs of said thread objects.

5. The method of claim 1 wherein each of said plurality of second dynamic lists is associated with a hash bucket.

6. The method of claim 1 wherein said plurality of second dynamic lists is implemented by a plurality of double-linked lists.

7. The method of claim 1 further comprising:
inserting a first object into said first dynamic list in the operating system; and
placing a copy of said first object in said first dynamic list into one of said plurality of second dynamic lists in the operating system upon said inserting said first object into said first dynamic list.

8. The method of claim 1 further comprising:
removing a first object from said first dynamic list; and
removing a copy of said first object from one of said plurality of second dynamic lists upon said removing said first object from said first dynamic list.

9. An article of manufacture comprising a computer-readable program storage medium for storing computer readable code embodied therein, said computer readable code being configured to permit a computer system to traverse a first set of objects in a first dynamic list in the computer system, comprising:
computer-implemented code for providing said first dynamic list that includes said first set of objects, copying said first set of objects, and permitting the computer system to partition copies of said first set of objects in said first dynamic list in an operating system of the computer system into a plurality of second dynamic lists in the operating system, each second dynamic list of said plurality of second dynamic lists contains a different subset of said copies of said first set of objects, said copies of said first set of objects being disposed in said plurality of second dynamic lists;
wherein said first dynamic list represents an active threads list being used in conjunction with a scheduler in said computer system, said first set of objects represent thread objects in said active threads list; and
computer-implemented code for permitting the computer system to traverse said plurality of second dynamic lists in parallel by using a plurality of kernel traversal threads, thereby causing at least some of said copies of said first set of objects to be traversed in parallel by the kernel traversal threads;
wherein traversal of said plurality of second dynamic lists in parallel includes re-calculating priority values associated with said copies of said first set of objects that are disposed in said plurality of second dynamic list; and
wherein said traversal of said plurality of second dynamic lists includes modifying a priority value associated with each of said copies of said first set of objects.

10. The article of manufacture of claim 9 wherein a number of said plurality of said second dynamic lists equals a number of available processors in said computer system.

11. The article of manufacture of claim 9 wherein said computer readable code for permitting the computer system to partition includes computer readable code for permitting the computer system to implement a hashing algorithm.

12. The article of manufacture of claim 11 wherein said hashing algorithm employs thread IDs of said thread objects.

13. The article of manufacture of claim 9 wherein each of said plurality of second dynamic lists is associated with a hash bucket.

14. The article of manufacture of claim 9 wherein said plurality of second dynamic lists is implemented by a plurality of double-linked lists.

15. The article of manufacture of claim 9 further comprising:
computer-implemented code for permitting the computer system to insert a first object into said first dynamic list in the operating system; and
computer-implemented code for permitting the computer system to place a copy of said first object in said first dynamic list into one of said plurality of second dynamic lists in the operating system upon inserting said first object into said first dynamic list.

16. The article of manufacture of claim 9 further comprising:
computer-implemented code for permitting the computer system to remove a first object from said first dynamic list; and
computer-implemented code for permitting the computer system to remove a copy of said first object from one of said plurality of second dynamic lists upon removing said first object from said first dynamic list.

17. An arrangement configured for traversing a first set of objects in a first dynamic list in a computer system, the arrangement comprising:
a processor;
a computer-readable program storage medium;
means for providing said first dynamic list that includes said first set of objects;
means for copying said first set of objects;
means for partitioning copies of said first set of objects in said first dynamic list in an operating system of the computer system into a plurality of second dynamic lists in the operating system, each second dynamic list of said plurality of second dynamic lists contains a different subset of said copies of said first set of objects, copies of said first set of objects being disposed in said plurality of second dynamic lists;
wherein said first dynamic list represents an active threads list being used in conjunction with a scheduler in said computer system, said first set of objects represent thread objects in said active threads list; and
means for traversing said plurality of second dynamic lists in parallel by using a plurality of kernel traversal threads, thereby causing at least some of said copies of said first set of objects to be traversed in parallel by the kernel traversal threads;
wherein said traversing of said plurality of second dynamic lists in parallel includes re-calculating priority values associated with said copies of said first set of objects that are disposed in said plurality of second dynamic lists; and
wherein said traversing of said plurality of second dynamic lists includes modifying a priority value associated with each of said conies of said first set of objects.

18. The arrangement of claim 17 wherein a number of said plurality of first means equals a number of available processors in said computer system.

19. The arrangement of claim 17 wherein each of said plurality of first means is implemented by a linked list.

20. The arrangement of claim 17 wherein each of said plurality of first means is implemented by a double-linked list.

21. The arrangement of claim 17 further comprising:
means for inserting a first object into the first dynamic list in the operating system; and
means for placing a copy of the first object in said first dynamic list into one of the plurality of second dynamic lists in the operating system upon inserting the first object into the first dynamic list.

22. The arrangement of claim 17 further comprising:
means for removing a first object from the first dynamic list; and
means for removing a copy of the first object from one of the plurality of second dynamic lists upon removing the first object from the first dynamic list.

23. An apparatus for traversing a first set of objects in a first dynamic list in a computer system, the apparatus comprising:
a processor;
a computer-readable program storage medium;
an operating system configured to provide said first dynamic list that includes said first set of objects, copy said first set of objects, and partition copies of said first set of objects in said first dynamic list in the operating system of the computer system into a plurality of second dynamic lists in the operating system, each second dynamic list of said plurality of second dynamic lists contains a different subset of said copies of said first set of objects, copies of said first set of objects being disposed in said plurality of second dynamic lists,
wherein said first dynamic list represents an active threads list being used in conjunction with a scheduler in said computer system, said first set of objects represent thread objects in said active threads list, and
wherein the operating system is configured to traverse said plurality of second dynamic lists in parallel by using a plurality of kernel traversal threads, thereby causing at least some of said copies of said first set of objects to be traversed in parallel by the kernel traversal threads;
wherein traversal of said plurality of second dynamic lists in parallel includes re-calculating priority values associated with said copies of said first set of objects that are disposed in said plurality of second dynamic lists; and
wherein said traversal of said plurality of second dynamic lists includes modifying a priority value associated with each of said copies of said first set of objects.

24. The apparatus of claim 23 wherein the operating system is configured to insert a first object into the first dynamic list in the operating system, and to place a copy of the first object in the first dynamic list into one of the plurality of second dynamic lists in the operating system upon inserting the first object into the first dynamic list.

25. The apparatus of claim 23 wherein the operating system is configured to remove a first object from the first dynamic list; and to remove a copy of the first object from one of the plurality of second dynamic lists upon removing the first object from the first dynamic list.

26. The method of claim 1, further comprising:
determining a hash of an object in the first set of objects; and
inserting a copy of the object into a list in the plurality of second dynamic lists, wherein a hash bucket that points to the list is associated with the hash of the object.

27. The article of manufacture of claim 9, further comprising:
computer readable code for determining a hash of an object in the first set of objects; and
computer readable code for inserting a copy of the object into a list in the plurality of second dynamic lists, wherein a hash bucket that points to the list is associated with the hash of the object.

28. The arrangement of claim 17, further comprising:
means for determining a hash of an object in the first set of objects; and
means for inserting a copy of the object into a list in the plurality of second dynamic lists, wherein a hash bucket that points to the list is associated with the hash of the object.

29. The apparatus of claim 23, wherein the operating system is configured to determine a hash of an object in the first set of objects and insert a copy of the object into a list in the plurality of second dynamic lists, wherein a hash bucket that points to the list is associated with the hash of the object.

30. The method of claim 1, wherein the priority values are used by a scheduler in the operating system.

31. The method of claim 1, wherein re-calculating the priority values includes re-prioritizing the priority values in parallel.

32. The article of manufacture of claim 9, wherein the priority values are used by a scheduler in the operating system.

33. The article of manufacture of claim 9, wherein re-calculating the priority values includes re-prioritizing the priority values in parallel.

34. The arrangement of claim 17, wherein the priority values are used by a scheduler in the operating system.

35. The arrangement of claim 17, wherein re-calculating the priority values includes re-prioritizing the priority values in parallel.

36. The apparatus of claim 23, wherein the priority values are used by a scheduler in the operating system.

37. The apparatus of claim 23, wherein re-calculating the priority values includes re-prioritizing the priority values in parallel.

* * * * *

UNITED STATES PATENT AND TRADEMARK OFFICE
CERTIFICATE OF CORRECTION

| | | |
|---|---|---|
| PATENT NO. | : 7,516,151 B2 | Page 1 of 1 |
| APPLICATION NO. | : 10/979413 | |
| DATED | : April 7, 2009 | |
| INVENTOR(S) | : Scott J. Norton et al. | |

It is certified that error appears in the above-identified patent and that said Letters Patent is hereby corrected as shown below:

In column 8, line 52, in Claim 17, delete "conies" and insert -- copies --, therefor.

In column 9, line 34, in Claim 23, delete "lists;" and insert -- list, --, therefor.

Signed and Sealed this

Eighth Day of September, 2009

David J. Kappos
*Director of the United States Patent and Trademark Office*